United States Patent
Ishii (10) Patent No.: US 7,215,460 B2
(45) Date of Patent: May 8, 2007

(54) SEQUENCE AND TIMING CONTROL OF WRITING AND REWRITING PIXEL MEMORIES FOR ACHIEVING HIGHER NUMBER OF GRAY SCALES

(76) Inventor: Fusao Ishii, 350 Sharon Park Dr., G26, Menlo Park, CA (US) 94025

( * ) Notice: Subject to any disclaimer, the term of this patent is extended or adjusted under 35 U.S.C. 154(b) by 0 days.

(21) Appl. No.: 11/183,216

(22) Filed: Jul. 16, 2005

(65) Prior Publication Data

US 2005/0254116 A1  Nov. 17, 2005

Related U.S. Application Data

(63) Continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(51) Int. Cl.
*G02B 26/00* (2006.01)
(52) U.S. Cl. ...................................... 359/291; 359/290
(58) Field of Classification Search ................ 359/290, 359/291, 223, 224, 318, 292, 295
See application file for complete search history.

(56) References Cited

U.S. PATENT DOCUMENTS

| | | | |
|---|---|---|---|
| 5,424,852 A * | 6/1995 | Funada | 358/448 |
| 6,133,894 A * | 10/2000 | Yagyu | 345/89 |
| 7,049,164 B2 * | 5/2006 | Bruner | 438/32 |
| 7,071,907 B1 * | 7/2006 | Duboc et al. | 345/87 |
| 7,106,490 B2 * | 9/2006 | Sandstrom | 359/290 |
| 2005/0231498 A1 * | 10/2005 | Abe et al. | 345/204 |
| 2006/0056007 A1 * | 3/2006 | Yamazaki et al. | 359/295 |

\* cited by examiner

*Primary Examiner*—Timothy Thompson
(74) *Attorney, Agent, or Firm*—Bo-In Lin (57) ABSTRACT

A micromirror device with a lower driving voltage is disclosed. The lower driving voltage is achieved by projecting a partial light for image display during a micromirror is oscillating from fully on state to a fully off state. The micromirror device includes a reflective element supported on a hinge for oscillating and positioning at least three states. These three states are a fully on state, a fully off state, and a partially ON angular positions in responding to a digital control signal. The oscillation of the micromirrors is controlled in responding to a digital control signal wherein the digital control signal is controlled for writing into display pixels in an interleave-and-jump sequence to jump multiple lines to non-sequential lines of a display image.

23 Claims, 10 Drawing Sheets

SEQUENCE AND TIMING CONTROL OF WRITING AND REWRITING PIXEL MEMORIES FOR ACHIEVING HIGHER NUMBER OF GRAY SCALES

This application is a Continuation in Part (CIP) Application of U.S. patent applications Ser. Nos. 10/698,620 filed on Nov. 1, 2003 now abandoned, 10/699,140 filed on Nov. 1, 2003 now U.S. Pat. No. 6,862,127, and 10/699,143 filed on Nov. 1, 2003 now U.S. Pat. No. 6,903,860 by the Applicant of this Patent Applications. The disclosures made in these Patent Applications are hereby incorporated by reference in this Patent Application.

TECHNICAL FIELD

This invention relates to micromirror arrays and control circuits to control the micromirrors. More particularly, this invention relates to signal control methods for controlling the sequential order and timing of inputting intermediate state signals when scanning through a display frame of horizontal lines to enable more accurate control of gray scales while operated with low driving voltages.

BACKGROUND ART

Even though there are significant advances made in recent years on the technologies of implementing electromechanical micromirror devices as spatial light modulator, there are still limitations and difficulties when employed to provide high quality images display. Specifically, when the display images are digitally controlled, the image qualities are adversely affected due to the fact that the image is not displayed with sufficient number of gray scales.

Figure 1A:
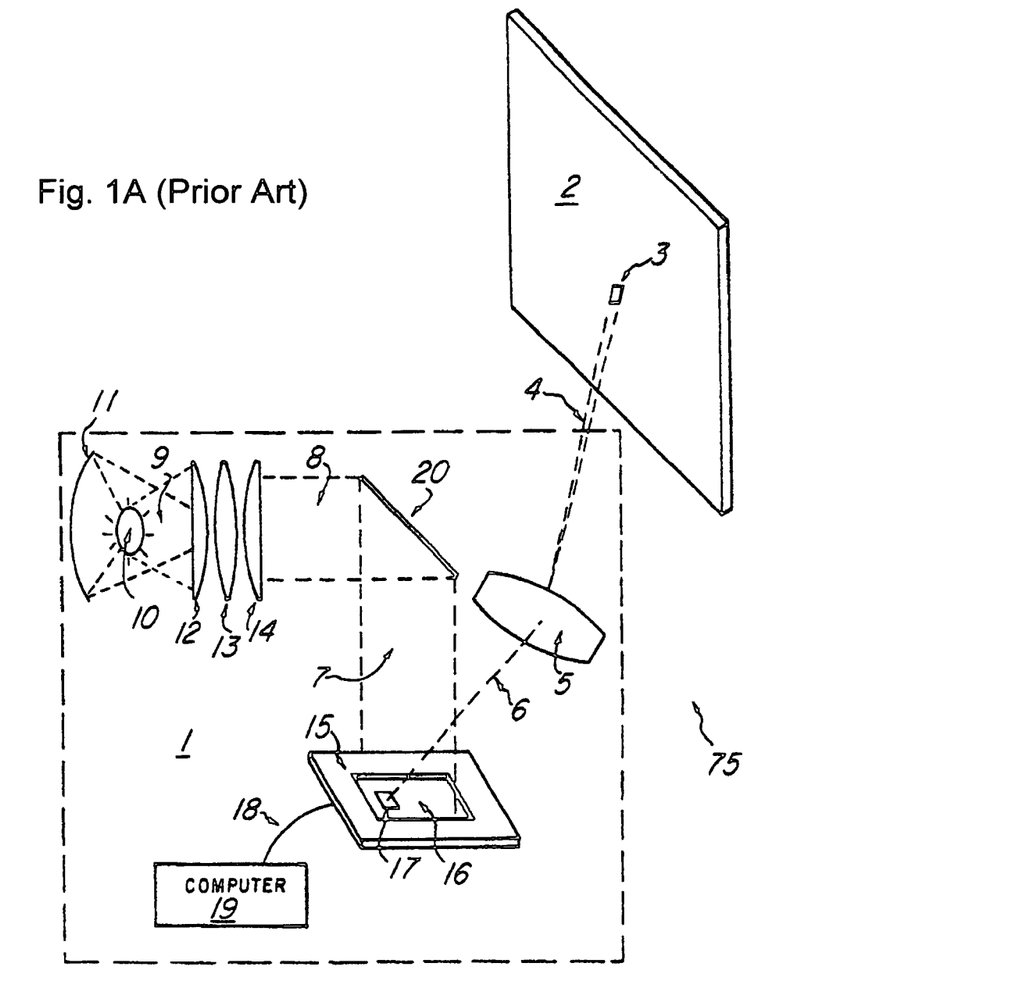
FIGS. 1A and 1B are functional block diagram and a top view of a portion of a micromirror array implemented as a spatial light modulator for a digital video display system of a conventional display system disclosed in a prior art patent.
Figure 1B:
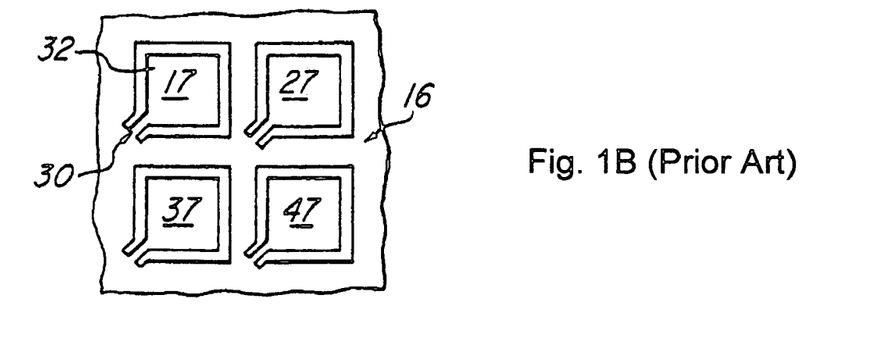

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. Referring to FIG. 1A for a digital video system 1 disclosed in a relevant U.S. Pat. No. 5,214,420 that includes a display screen 2. A light source 10 is used to generate light energy for ultimate illumination of display screen 2. Light 9 generated is further concentrated and directed toward lens 12 by mirror 11. Lens 12, 13 and 14 form a beam columnator to operative to columnate light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes an array of switchable reflective elements, e.g., micromirror devices 32, such as elements 17, 27, 37, and 47 as reflective elements attached to a hinge 30 that shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of micromirror control scheme as that implemented in the U.S. Pat. No. 5,214,420 and by most of the conventional display system imposes a limitation on the quality of the display. Specifically, when applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than LSB. The least brightness, which determines gray scale, is the light reflected during the least pulse width. The limited gray scales lead to degradations of image display.

Figure 1C:
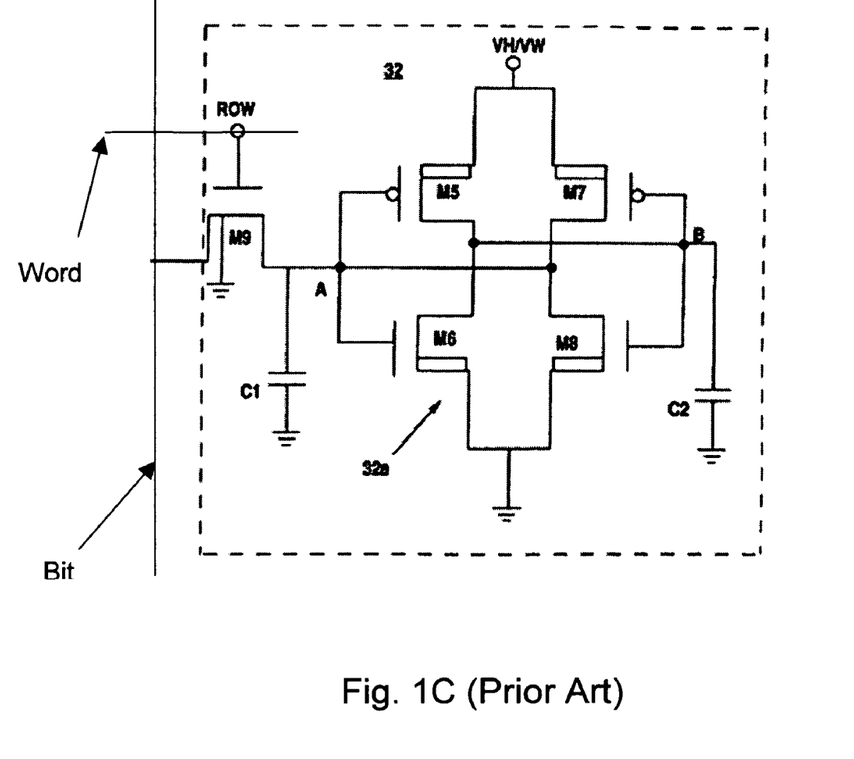
FIG. 1C is a circuit diagram for showing a prior art circuit for controlling a micromirror to position at an ON and OFF states of a spatial light modulator.

Specifically, in FIG. 1C an exemplary circuit diagram of a prior art control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states. state 1 is Node A high and Node B low and state 2 is Node A low and Node B high.

Figure 1D:
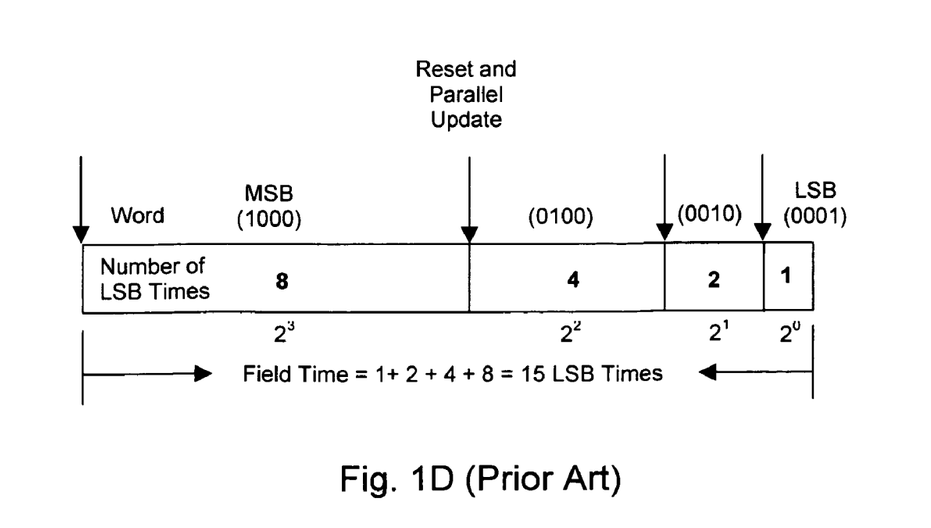
FIG. 1D is diagram for showing the binary time intervals for a four bit gray scale.

The dual states switching as illustrated by the control circuit controls the micromirrors to position either at an ON of an OFF angular orientation as that shown in FIG. 1A. The brightness, i.e., the gray scales of display for a digitally control image system is determined by the length of time the micromirror stays at an ON position. The length of time a micromirror is controlled at an ON position is in turned controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each; of the four bits where 1 is for the least significant bit and 8 is for the most significant bit. According to the control mechanism as shown, the minimum controllable differences between gray scales for showing different brightness is a brightness represented by a "least significant bit" that maintaining the micromirror at an ON position.

When adjacent image pixels are shown with great degree of different gray scales due to a very coarse scale-of controllable gray scale, artifacts are shown between these adjacent image pixels. That leads to image degradations. The image degradations are specially pronounced in bright areas of display when there are "bigger gaps" of gray scales between adjacent image pixels. It was observed in an image of a female model that there were artifacts shown on the forehead, the sides of the nose and the upper arm. The artifacts are generated due to a technical limitation that the digital controlled display does not provide sufficient gray scales. At the bright spots of display, e.g., the forehead, the sides of the nose and the upper arm, the adjacent pixels are displayed with visible gaps of light intensities.

As the micromirrors are controlled to have a fully on and fully off position, the light intensity is determined by the length of time the micromirror is at the fully on position. In order to increase the number of gray scales of display, the speed of the micromirror must be increased such that the digital control signals can be increased to a higher number of bits. However, when the speed of the micromirrors is increased, a stronger hinge is necessary for the micromirror to move faster. In order to drive the micromirrors supported on a further strengthened hinge, a higher voltage is required.

The higher voltage may exceed twenty volts and may even be as high as thirty volts. The micromirrors manufacture by applying the CMOS technologies probably would not be suitable for operation at such higher range of voltages and therefore the DMOS micromirror devices may be required. In order to achieve higher degree of gray scale control, a more complicate manufacturing process and larger device areas are necessary when DMOS micromirror is implemented. Conventional modes of micromirror control are therefore facing a technical challenge that the gray scale accuracy has to be sacrificed for the benefits of smaller and more cost effective micromirror display due to the operational voltage limitations.

There are many patents related to spatial light modulation that includes U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed and provided direct resolutions for a person of ordinary skill in the art to overcome the above-discussed limitations and difficulties.

Therefore, a need still exists in the art of image display systems applying digital control of a micromirror array as a spatial light modulator to provide new and improved systems such that the above-discussed difficulties can be resolved.

SUMMARY OF THE INVENTION

The present invention relates to control circuits for micromirror devices and arrays of micromirror devices. The purpose of controlling the arrays is to apply such array as spatial light modulators (SLMs). In one aspect, the present invention provides a micromirror device in which the reflecting element is controlled to reflect light for image display at multiple intermediate positions for providing more flexibly controllable gray scales of display without requiring a higher speed of micromirror oscillation thus maintaining a low operational voltage.

In another aspect, the present invention provides a micromirror device operated with an ON state, an OFF state and an intermediate Oscillating state.

In yet another aspect, the present invention provides a micromirror device comprising an array of micromirrors that are controlled to operate with intermediate oscillating states to provide a least brightness that is a fraction, e.g., approximately 37%, of the fully ON state. The gray scale for display is now controllable to project finer scale of brightness differences between adjacent pixels with an additional controllable state to provide a fraction of brightness of the fully-on state for display. The annoying artifacts shown on a display caused by adjacent pixels having huge gray scale gaps can be significantly reduced.

In yet another aspect, the present invention provides a method of control the oscillation an array of micromirror devices wherein the micromirrors are enabled to oscillate in a reverse direction or stop before the micromirror completes a full oscillation cycle. Aided by such control flexibility and the fractional brightness for image display during an intermediate oscillation state, additional flexibilities are now provided to fine tune the gray scale for each image pixel especially for the high brightness display area where a gray scale difference are proportionally amplified due to the high intensity of light projections.

These and other objects and advantages of the present invention will no doubt become obvious to those of ordinary skill in the art after having read the following detailed description of the preferred embodiment, which is illustrated in the various drawing figures.

BRIEF DESCRIPTION OF FIGURES

The present invention is described in detail below with reference to the following Figures.

DESCRIPTION OF PREFERRED EMBODIMENTS

Figure 2:
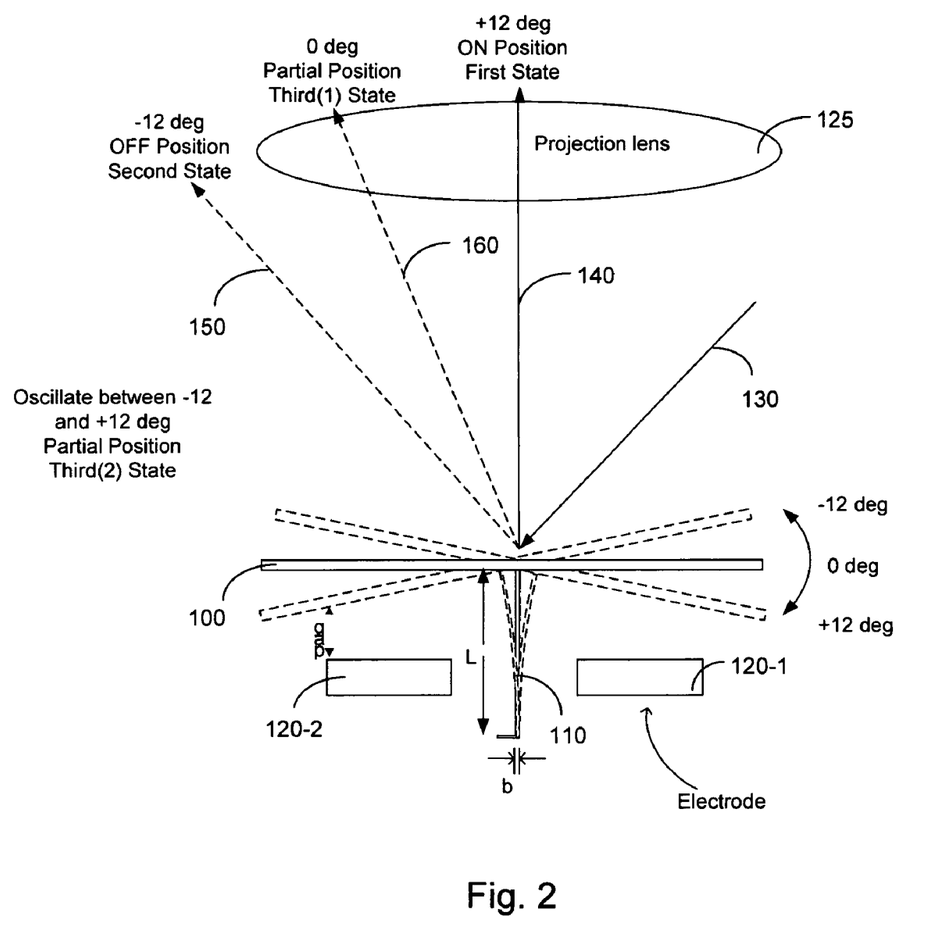
FIG. 2 is a side cross sectional diagram of a micromirror device of this invention wherein the micromirror is oscillating between an ON-OFF position for providing at least an intermediate state.

Referring to FIG. 2 for a side cross sectional view for illustrating the oscillating motions of a micromirrors according to the control circuit of the present invention. A micromirror 100 supported on a hinge 110 formed on a substrate (not shown), is electrically controlled by two electrodes 120-1 and 120-2 to move to different positions, e.g., from +12 degrees to −12 degrees as shown. The incident light is projected along an optical path 130 and the light reflected from the micromirror 100 is projected to a projection lens 125 for further projecting to a display surface (not shown). The micromirror is controlled to move to a full-on state when the micromirror is positioned at the +12 degrees with the reflected light projected fully onto the projection lens along a 140 direction perpendicular to the projection lens 125. The micromirror 100 is controlled to move to a full-off state when the micromirror 100 is positioned at a −12 degrees with the reflected light 150 totally misses the projection lens 125. In a preferred embodiment, the micromirror 100 is controlled to move to an intermediate state when the micromirror is controlled to move to a zero degree position when the reflected light is projected along a third state direction 160. In different preferred embodiments, the micromirrors can be oscillating between a positive and negative angle relative to a perpendicular axis to the surface of the micromirror. The fully on and fully off positions as defined by these positive and negative angles can be flexibly designed depending on the system specifications for each specific application.

Figure 3:
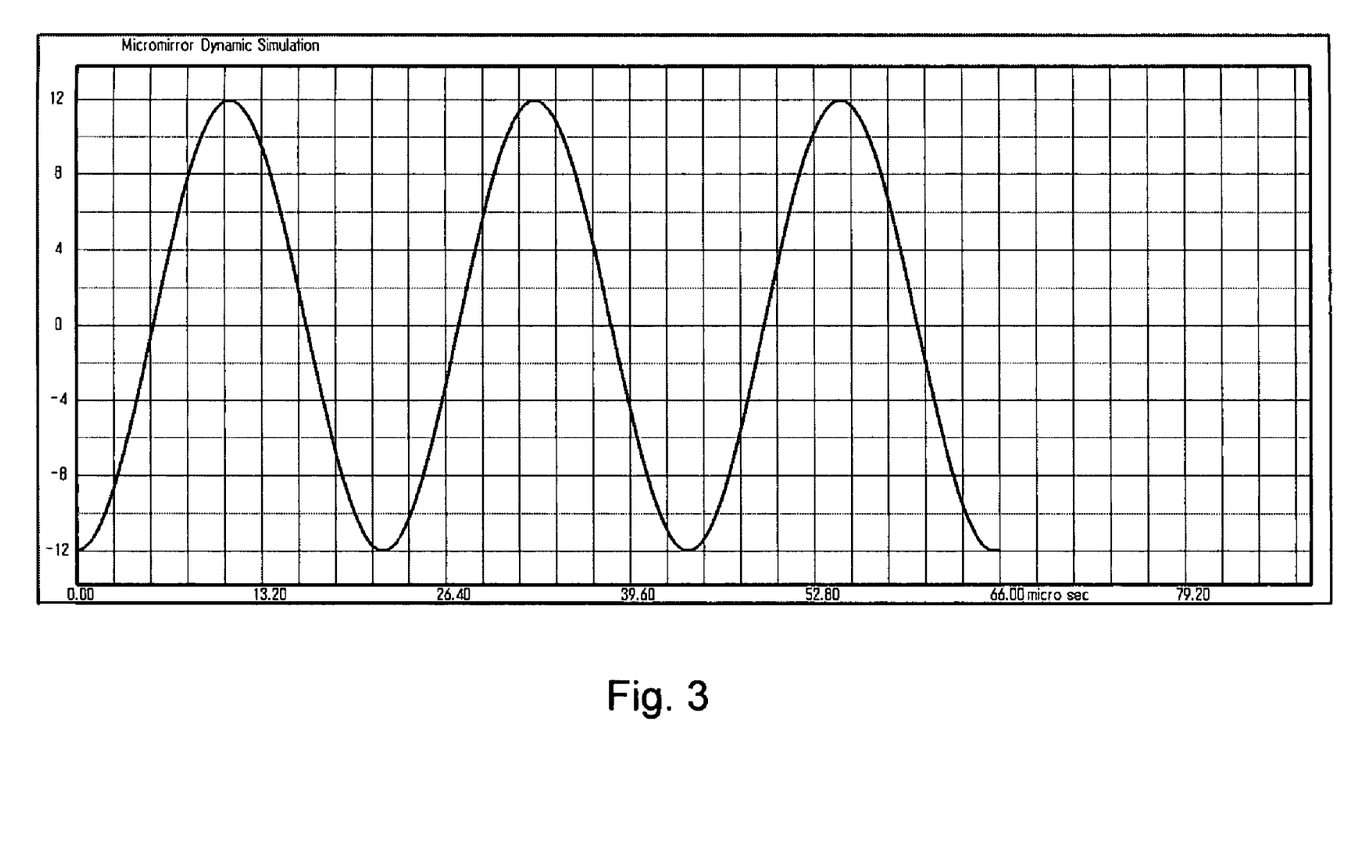
FIG. 3 is a diagram for showing the micromirror angle versus time for computing an illumination to display an image with different light intensities wherein one-oscillating cycle provides approximately 37% light intensity of the fully-on state.

Referring to FIG. 3 for a waveform diagram showing the mirror angular position changes with time as the micromirror oscillates from the on state to an off state. A computation is performed to compute the light projection through the projection lens 125 for image display. During an oscillating condition, there is 37% of the light of the fully on state. For example, if 20 microseconds of an ON time provide a light output of one lumen, then the one oscillating cycle provides 0.37 lumen output of light. For the purpose of minimize oscillation decay of the micromirrors 100, the micromirror array is contained and operated in a vacuum-sealed environment. With a partial light projection of light to contribute to the image light intensity, a higher number of gray scales are achievable without requiring a high speed of mirror oscillation. The micromirror devices can be controlled at a voltage substantially lower than twenty volts, e.g., around five volts, such that the spatial light modulator (SLM) can be implemented with CMOS technologies.

Figure 4:
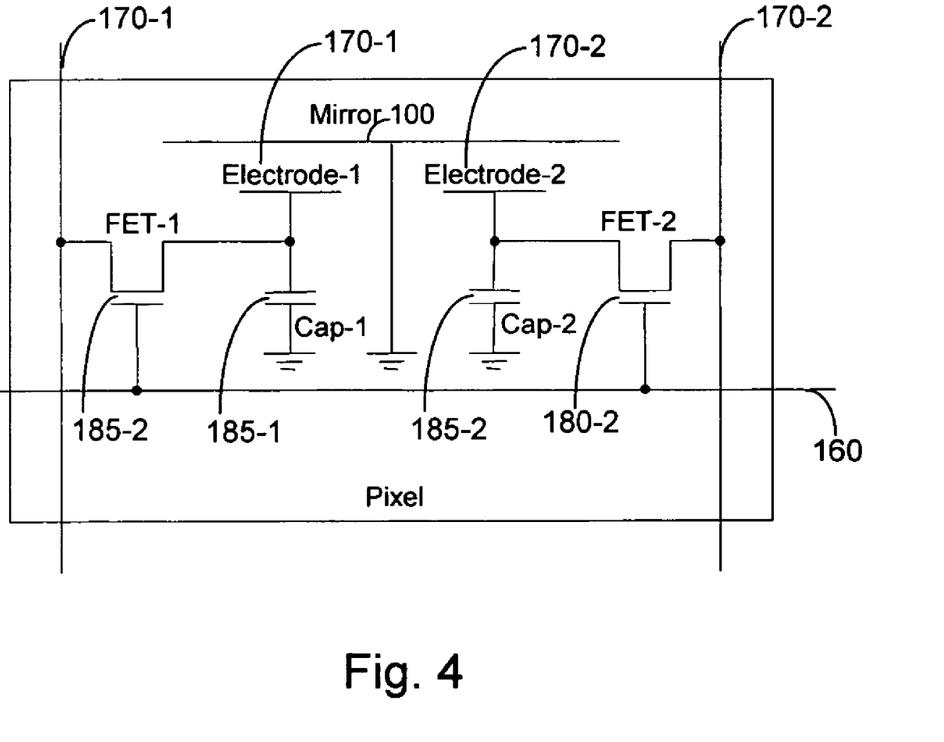
FIG. 4 is a circuit diagram for controlling a micromirror of this invention.

Referring to FIG. 4 for a preferred embodiment showing a control circuit to control the oscillation of the micromirror 100 to position at an ON state, an OFF state and an intermediate state based on the ON-OFF states of the electrodes 120-1 and 120-2. The control circuit includes a wordline 160 and two bit-lines 170-1 and 170-2 to alternate turn on two transistors 180-1 and 180-2, e.g., FET-1 and FET-2 respectively. Each of these transistors 180-1 and 180-2 is connected to a capacitor 185-1 and 185-2, e.g., Cap-1 and Cap-2 respectively. Each micromirror for display of one pixel is therefore control to have multiple states depending on the input to the bit-lines 170-1 and 170-2. Specifically, the control table can be represented as the followings:

TABLE 1

| Bit #1 | Bit #2 | State |
|---|---|---|
| 1 | 0 | ON |
| 0 | 1 | OFF |
| 0 | 0 | Intermediate |
| 1 | 1 | Undefined |

Figure 5A:
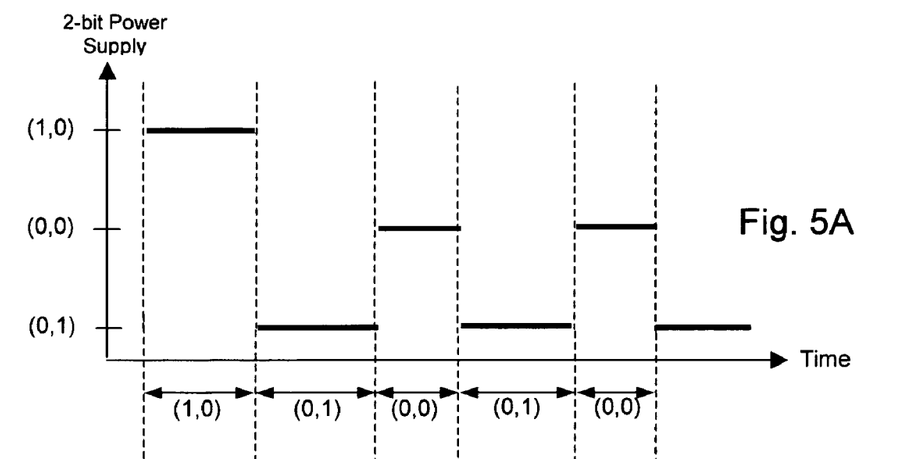
FIG. 5A is a diagram for showing the change of micromirror states over time wherein the micromirror may be controlled to position at three different states.
Figure 5B:
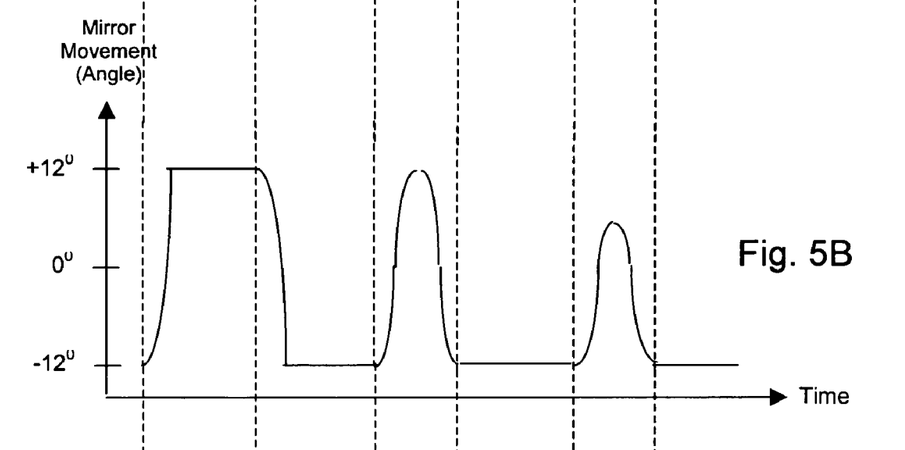
FIG. 5B is a diagram for showing the micromirror oscillation from one position to a different positions according to the different states shown in FIG. 5A.
Figure 5C:
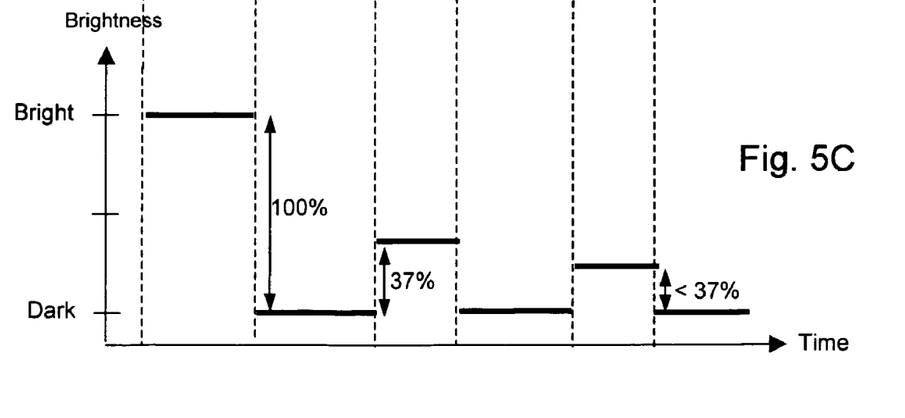
FIG. 5C is a diagram for showing the brightness as the micromirror oscillating between different states according to that shown in FIGS. 5A and 5B.

Referring to FIG. 5 for an exemplary timing diagram for illustrating the changes of control states between a first state, an intermediate state and a second state. The first state is a fully ON state to provide a highest brightness. The second state is an OFF state to provide a lowest brightness. Additionally, there is an intermediate state as a third state for providing flexibility to adjust brightness thus controls the gray scale of each image pixel.

As shown in the timing diagram of FIG. 5A and FIG. 5B, the oscillating micromirror is provided with flexibility to oscillate between the first, second and third states. The micromirror is oriented at +12 degrees at a fist state. The micromirror is oriented at a −12 degrees at a second state and oriented at zero degree at an intermediate state either at the end of the oscillating cycles or in an intermediate points that may be a fraction of an oscillating cycle.

As shown in the timing diagram of FIG. 5C, the brightness of an image pixel as projected from a micromirror is a function of the length of the time the micromirror stays at a certain states and also is a function of the fraction of light when the mirror oscillates and stays at an intermediate state. FIG. 5C clearly shows that the gray scale can be flexibly controlled with much greater degree of accuracy since the gray scale is no longer limited by the least significant bit of the control word.

Therefore, in this invention, the gray scales can be controlled by controlling the durations of the micromirror positioned at three different states. Furthermore, oscillation of the micromirrors is controllable to swing from one state to another state at a mid-point of an oscillation cycle. The gray scale GS is therefore functional depends on Ts1, Ts2, and Ts3 that represent lengths of time the micromirror is positioned at different three states, and also depends on the lengths of time for the micromirror to change from one state to another since there will be partial projection of the light to the image pixel from as the micromirror swing through at least one intermediate state.

Figure 6A:
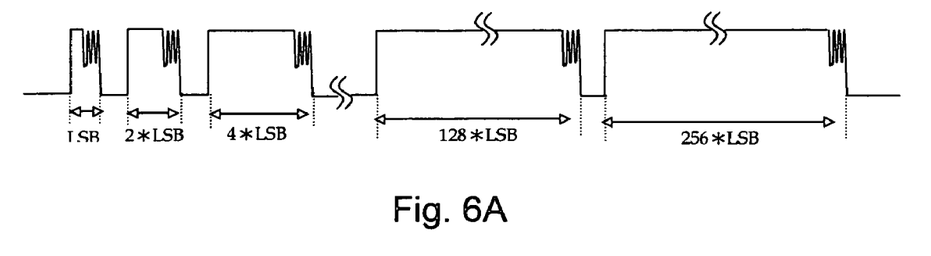
FIG. 6A to 6D are timing diagrams for showing the different time slots a mirror oscillation signal may be inserted to adjust the angular positions of the micromirrors.
Figure 6B:
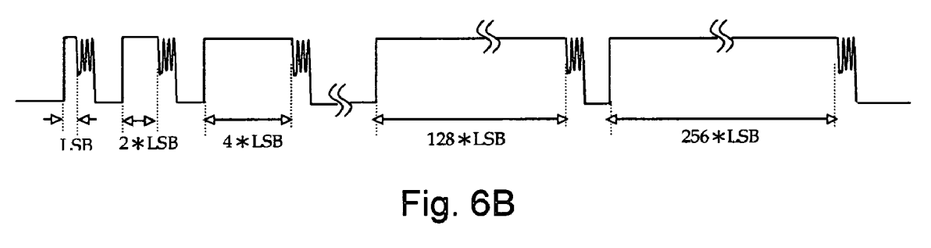
Figure 6C:
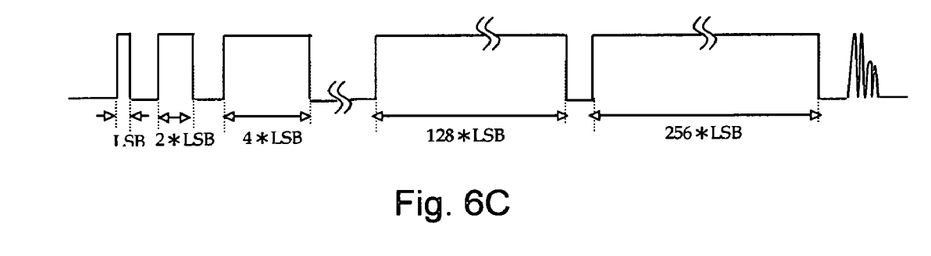
Figure 6D:
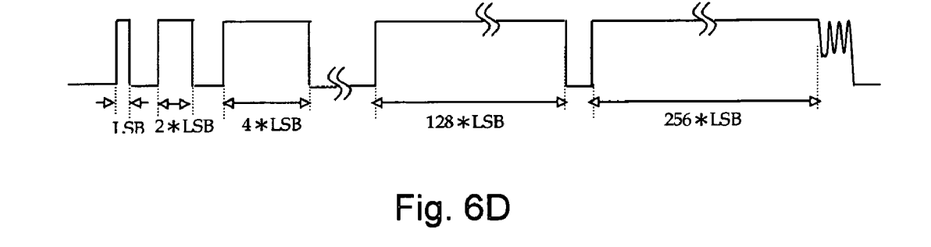
Figure 7A:
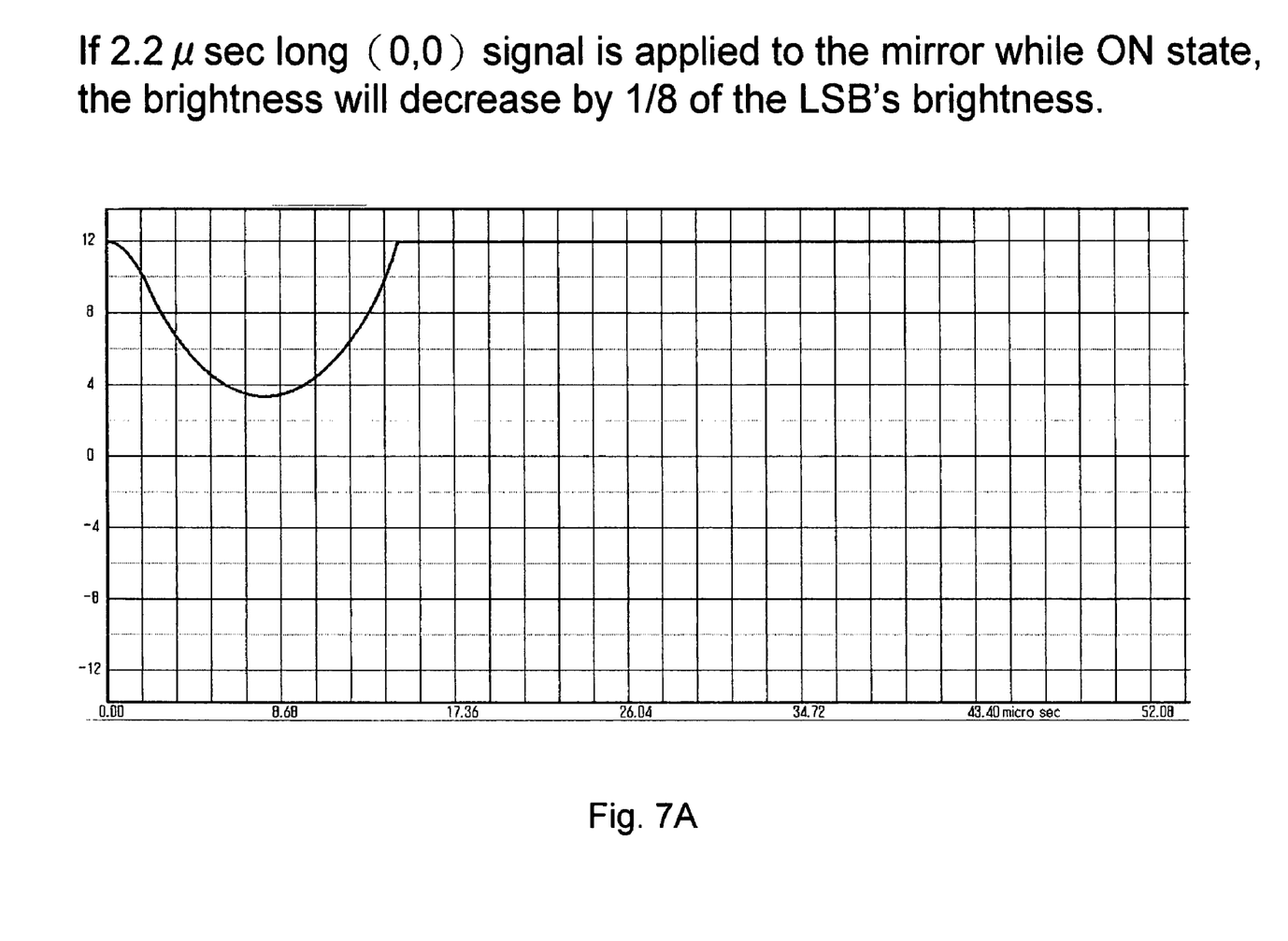
FIG. 7A are 7B are timing diagrams for showing the time used for writing a (0,0) while the mirror is at an ON and OFF stage respectively
Figure 7B:
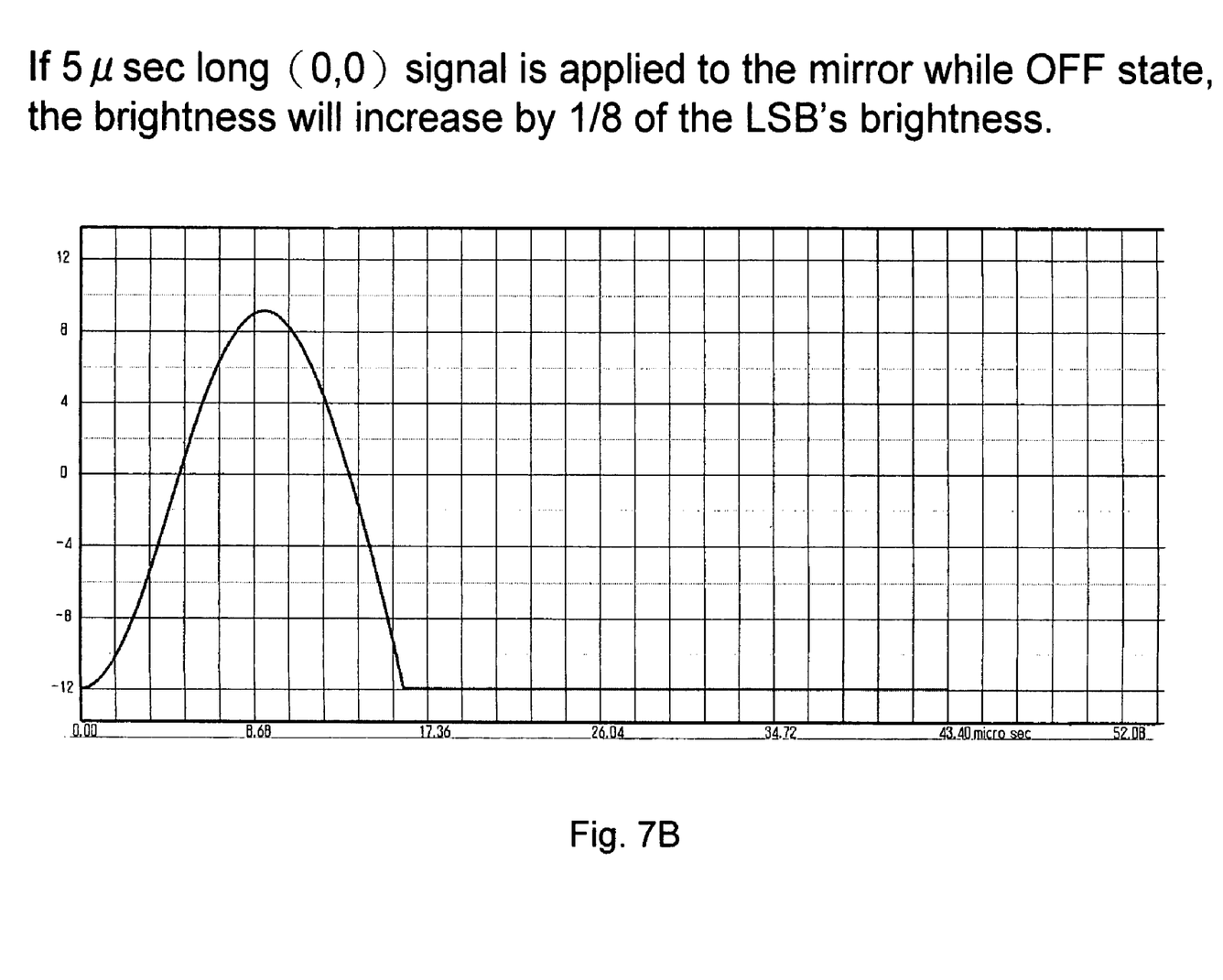

In order to properly input control signals for positioning the micromirrors at an intermediate state to increase the gray scales, this invention further discloses new methods for inputting the control signals. The new methods for inputting the control signals are different from the conventional line-by-line scanning for the entire display frame. Referring to FIG. 6A for a timing diagram wherein a sequence of control words of different lengths for controlling the micromirrors at different positions. These different lengths control the gray scale for placing the micromirrors at an ON, OFF, or an intermediate states. These different lengths are defined by the number of bits of the control words, e.g., a least significant bit $2^0$*(LSB), $2^1$*LSB, $2^2$*LSB, . . . , $2^5$*LSB, and $2^6$*LSB, wherein $2^6$*LSB=64*LSB is the control word with a most significant bit (MSB). For the purpose of illustration, a pulse of (0,0) representing a control signal to place the micromirror at an intermediate state. The signal (0, 0) is inputted as a pulse inserted in the MSB time slot that takes up about 5.0 or 2.2 microseconds depending on inputting the (0,0) signal to a originally ON or OFF state of the micromirrors as that shown in FIGS. 7A and 7B.

Assuming that the micromirror is capable of providing seven bits of gray scales without the intermediate state, the pulse inserted is applied to increase the brightness by ⅛ of that produced by a single LSB pulse. Therefore, by inserting seven or less pulses with each pulse take up about five microseconds can generate an equivalent gray scales equivalent to a 10 bits of control words On the other hand, when a pulse of (0,0) with 2.2 µsec duration is inserted in the MSB with decrease the brightness by ⅛ of a single LSB pulse. Again, this is equivalent of the capability to control the gray scales with ten bits of control words.

However, in order to control the timing for inputting the (0,0) pulses for a high definition TV (HDTV) display, special timing control would be required. An HDTV has 1080 horizontal lines of pixels for vertically scanning over a display panel. The total time required to write a (0,0) pulses to all these lines would be 21.6 µsec, i.e., 20 nanosecond time 1080 lines. However, according to FIG. 6A, a more suitable application time of an intermediate pulse of (0,0) to the MSM time period is about 2.2 µsec when the MSB is at an ON state or 5.0 µsec when the MSB is at an OFF state.

However, in order to control the timing for inputting the (0,0) pulses for a high definition TV (HDTV) display, special timing control would be required. An HDTV has 1080 lines and each line has about 2000 pixels to horizontally scan over a display panel. In order to achieve the purpose of providing a gray scale equivalent to ten bits, i.e., 1024 levels of brightness, with a control word of seven bits, the gray scale of each pixel is controlled with a seven bits of pulse width modulation (PWM) of fully ON-OFF switches and three bits by intermediate states provided by writing (0,0) to the control circuit. In order to satisfy the flicker frequency requirement of 60 frames per second, there are 180 fields per second for writing each of the three colors. One filed of image display must be completed in ⅟₁₈₀ second, i.e., 5556 microseconds. The control circuit must control the micromirrors to have seven digits of ON-OFF modulations and seven intermediate pulses within this 5556 microseconds. The shortest digital pulse is defined by the least significant bit (LSB) and the time duration of this LSB is 5556/128=43 microseconds where 128 represent the value of seven binary bits that is $2^7$ and longest pulse represented by the maximum significant bit (MSB) is 64*LSB=2778 microseconds. There are two types of intermediate pulses. The first type is a positive pulse applied during an OFF state in the MSM period and a negative pulse during an ON state in the MSB period.

In a preferred embodiment, the positive pulse takes five microseconds and a negative pulse takes up 2.2 microseconds and each of these positive or negative pulses provides ⅛ of brightness variation to the gray scales when applied during the MSB time slot. With time requirements for controlling the gray scales by applying a seven bits PWM and three bits of intermediate state pulses, the conventional method of completion of one display panel followed by next display panel of pixel data cannot function properly. It must take into account the time to write (0,0) into the memories for 1000 lines followed by rewriting all the memories that take up 5000 microseconds. Then additional times are required to write seven positive pulses and seven negative pulses in a MSB period. According to the conventional techniques, a total time of 5×1000×7+2.2×1000×7=50,400 microseconds are required. However, there are only 2778 microseconds in the MSB period and within this time period the control circuit must write and rewrite seven positive, seven negative pulses. For these reasons, conventional techniques of completing one display panel followed by next complete panel of pixel control scheme would not function properly. An alternate method of writing (0,0) is to write (0,0) in the first line and sequentially to the second, third and to the last line then come back to rewrite the first line to change it back to the original condition then go to the second line and repeat the same process. Since it take 20 nanoseconds to write one line, the (0,0) condition in the first line would stay on for 20 microseconds and the gray scales cannot be properly controlled due to the facts that the (0,0) state must be rewritten after 5.0 or 2.2 microseconds.

Figure 8:
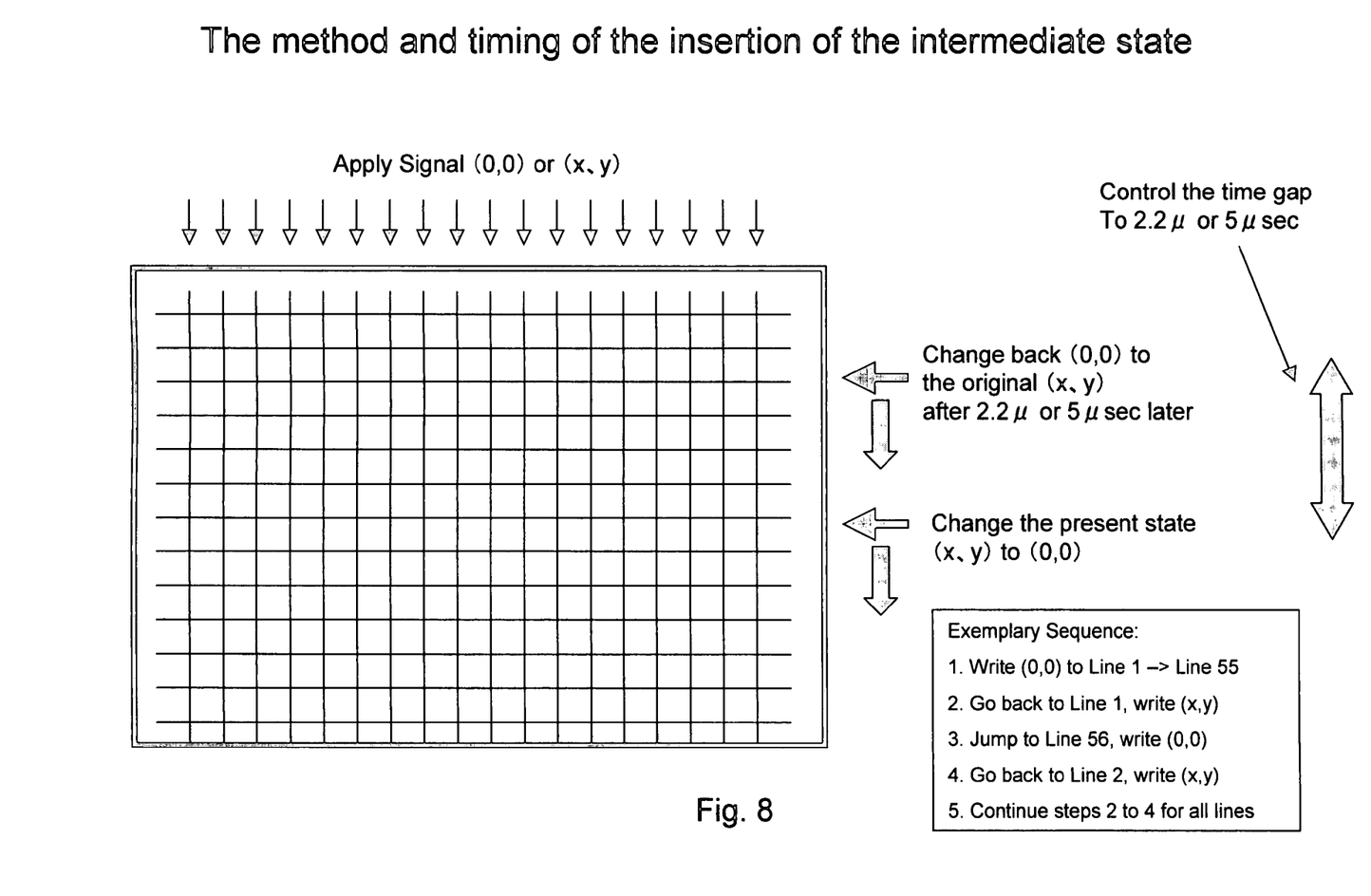
FIG. 8 is a timing diagram and control sequence of writing display lines and the sequence to insert the intermediate state into different lines.

Referring to FIG. 8 for a new timing control of this invention that applies a "interleave and jump" writing and rewriting process by writing (0,0) to the memories for the first 55 lines by writing every line in 40 nanoseconds. Then go back to the first line and rewrite that line in 20 nanoseconds followed by jumping to the $56^{th}$ line to write the (0,0) pulse in 20 nanoseconds then go back to the $2^{nd}$ line to rewrite the line in 20 nanoseconds, then continue to repeat above processes through the $1000^{th}$ line. The total amount of time applied can be calculated as the followings: A) for negative pulses, to write (0,0) to the 1000 lines takes up 2.2 microseconds and the total time to write and rewrite the 1000 lines takes up 40 microseconds and the total time is 42.2 microseconds. B) for positive pulses, a similar calculation obtains a time of 45 microseconds because the positive pulse requires five micro seconds to write. The total time required is computed as (7*42.2)+(7*45)=610.4 microseconds for writing and rewriting 14 pulses over 1000 lines. Since this is less than the MSB time period of 5556 microseconds, writing and rewriting of 14 pulses to achieve a gray scales of 10 bits, i.e., 1024 levels of brightness, can be achieved.

According to above descriptions of the preferred embodiments this invention discloses a micromirror device that includes a reflecting element supported on a hinge for oscillating and positioning at least a fully on, a fully off and an partially ON angular positions in responding to a digital control signal wherein said digital control signal is controlled for writing into display pixels in an interleave-and-jump sequence to jump multiple lines to non-sequential lines of a display image. In a preferred embodiment, the interleave-and-jump sequence comprising a sequence to jump either back or forth multiple lines to non-sequential horizontal lines of a display image. In a preferred embodiment, the interleave-and-jump sequence comprising a sequence to jump either back or forth multiple horizontal lines to non-sequential horizontal lines of a display image. In a preferred embodiment, the interleave-and-jump sequence comprising a sequence to jump either back or forth multiple vertical lines to non-sequential vertical lines of a display image. In a preferred embodiment, the micromirror device further includes a pulse width modulation (PWM) control circuit for receiving a series of PWM control words of different number of bits as a pulse width modulation PWM signal to control the reflecting element at the fully-ON and fully-Off angular positions for controlling a gray scale of display wherein the PWM control circuit further receiving the digital control signal as an oscillation signal for superimposing on the PWM signal for oscillating the reflecting element to the partially-ON angular position for further controlling the gray scale of display. In a preferred embodiment, the digital control signal for oscillating the reflecting element to a partially-ON angular position is inserted into a time slot controlled by a most significant bit (MSB) of the PWM control words. In a preferred embodiment, the digital control signal for oscillating the reflecting element to a partially-ON angular position is inserted into a time slot controlled by a number of bits ranging between a least significant bit (LSB) and a most significant bit (MSB) of the PWM control words. In a preferred embodiment, the digital control signal for oscillating the reflecting element to a partially-ON angular position is inserted into a time-gap slot between the time periods between a least significant bit (LSB) and a most significant bit (MSB) of the PWM control words. In a preferred embodiment, the interleave-and-jump sequence further comprising a sequence to jump either back or forth multiple lines to non-sequential lines of a display image for writing to the pixels in the non-sequential lines at different writing speeds. In a preferred embodiment, the micromirror device further includes a pulse width modulation (PWM) control circuit for receiving a series of PWM control words of different number of bits as a pulse width modulation PWM signal to control the reflecting element at the fully-ON and fully-Off angular positions for controlling a gray scale of display wherein the PWM control circuit further receiving the digital control signal as an oscillation signal for superimposing on the PWM signal for oscillating the reflecting element to the partially-ON angular position for further controlling the gray scale of display. The PWM control words have a maximum number of bits of M to control a maximum number of $2^M$ PWM controlled gray scales and the oscillating signal for controlling the reflecting element to a partially-ON angular position further increasing a maximum number of controllable gray scale to $2^{(M+N)}$ where N is a positive integer. In a preferred embodiment, the PWM control words having a maximum number of seven bits and the N is three for providing a maximum controllable gray scale of $2^{10}$. In a preferred embodiment, the digital control signal is controlled for writing and rewriting into display pixels in an interleave-and-jump sequence to jump multiple lines to non-sequential lines of a display image wherein a time duration for writing and rewriting the display pixels in the multiple lines are determined to satisfy a minimum flickering-prevention display frequency.

In a preferred embodiment, this invention further discloses a method for controlling a micromirror that includes a step of applying a digital control signal to control a reflecting element supported on a hinge to oscillate and position at least a fully ON, a fully OFF and an partially ON angular positions; and arranging said digital control signal for inputting to display pixels in an interleave-and-jump sequence to jump multiple lines to non-sequential lines of a display image.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A micromirror device comprising:
a reflecting element supported on a hinge for oscillating and positioning at least a fully on, a fully off and an partially ON angular positions in responding to a digital control signal wherein said digital control signal is controlled for writing into display pixels in an interleave-and-jump sequence to jump multiple lines to non-sequential lines of a display image; and
said interleave-and-jump sequence comprising a sequence to jump either back or forth multiple lines to non-sequential lines of a display image.

2. The device of claim 1, wherein:
said reflecting element is further provided for oscillating to different positions in responding to a two-bit digital control signal.

3. The device of claim 1, further comprising:
two electrodes and said reflecting element is further provided for oscillating to different positions in responding to a digital control signal for changing voltages of said two electrodes.

4. The device of claim 1, further comprising:
two electrodes and said reflecting element is further provided for oscillating to different positions in responding to a digital control signal representing by two digital bits with one bit applied to each of said two electrodes for changing voltages of said two electrodes.

5. The device of claim 1, wherein:
said reflecting element is further controlled to change an oscillation direction in an intermediate angular position between said fully on and fully off angular positions.

6. The device of claim 1, further comprising: a lens for receiving an incident light projection from said reflecting element for projecting an image display light wherein said lens is further disposed for projecting a portion of said image display light as said reflecting element oscillating between a fully on and fully off angular positions.

7. The micromirror device of claim 1 further comprising:
a vacuum seal package for enclosing said reflecting element and said hinge in a sealed vacuum space.

8. The device of claim 1, further comprising:
two separate independently controllable electrodes for controlling said reflecting element to oscillate to different positions.

9. The device of claim 1, further comprising:
two separate independently controllable electrodes disposed on two opposite sides of said hinge wherein each of said electrodes is connected to a control circuit for independently applying a control voltage thereon to control said reflecting element to oscillate to different positions.

10. The device of claim 9, wherein:
each of said electrodes is connected to a transistor having a gate connected to a common wordline and each transistor having a source connected to an independently controllable bitline for independently controlling said reflecting element to oscillate to different positions.

11. The device of claim 10, wherein:
each bitline connected to said source of said transistor is provided for receiving a binary bit represented by zero and one for applying a voltage to said electrodes for independently controlling said reflecting element to oscillate to different positions.

12. The device of claim 10, wherein:
each bitline connected to said source of said transistor is provided for receiving a binary bit represented by zero and one for applying a voltage to said electrodes for applying one of three digital signals represented by (1,0), (0,1) and (0,0) for controlling said reflecting element to oscillate to three different positions.

13. The device of claim 10, wherein:
each bitline connected to said source of said transistor is provided for receiving a binary bit represented by zero and one for applying a voltage to said electrodes for applying one of three digital signals represented by (1,0), (0,1) and (0,0) for controlling said reflecting element to oscillate to angular positions oriented substantially at a positive angle, a negative angle and 0° relative to a perpendicular axis to said reflecting element.

14. A micromirror device comprising:
a reflecting element supported on a hinge for oscillating and positioning at least a fully on, a fully off and an partially ON angular positions in responding to a digital control signal wherein said digital control signal is controlled for writing into display pixels in an interleave-and-jump sequence to jump multiple lines to non-sequential lines of a display image; and
said interleave-and-jump sequence comprising a sequence to jump either back or forth multiple horizontal lines to non-sequential horizontal lines of a display image.

15. A micromirror device comprising:
a reflecting element supported on a hinge for oscillating and positioning at least a fully on, a fully off and an partially ON angular positions in responding to a digital control signal wherein said digital control signal is controlled for writing into display pixels in an interleave-and-jump sequence to jump multiple lines to non-sequential lines of a display image; and said interleave-and-jump sequence comprising a sequence to jump either back or forth multiple vertical lines to non-sequential vertical lines of a display image.

16. The device of claim 1 further comprising:

a pulse width modulation (PWM) control circuit for receiving a series of PWM control words of different number of bits as a pulse width modulation PWM signal to control said reflecting element at said fully-ON and fully-Off angular positions for controlling a gray scale of display wherein said PWM control circuit further receiving said digital control signal as an oscillation signal for superimposing on said PWM signal for oscillating said reflecting element to said partially-ON angular position for further controlling said gray scale of display.

17. The device of claim 16 wherein:

said digital control signal for oscillating said reflecting element to a partially-ON angular position is inserted into a time slot controlled by a most significant bit (MSB) of said PWM control words.

18. The device of claim 16 wherein:

said digital control signal for oscillating said reflecting element to a partially-ON angular position is inserted into a time slot controlled by a number of bits ranging between a least significant bit (LSB) and a most significant bit (MSB) of said PWM control words.

19. The device of claim 16 wherein:

said digital control signal for oscillating said reflecting element to a partially-ON angular position is inserted into a time-gap slot between the time periods between a least significant bit (LSB) and a most significant bit (MSB) of said PWM control words.

20. A micromirror device comprising:

a reflecting element supported on a hinge for oscillating and positioning at least a fully on, a fully off and an partially ON angular positions in responding to a digital control signal wherein said digital control signal is controlled for writing into display pixels in an interleave-and-jump sequence to jump multiple lines to non-sequential lines of a display image; and said interleave-and-jump sequence further comprising a sequence to jump either back or forth multiple lines to non-sequential lines of a display image for writing to said pixels in said non-sequential lines at different writing speeds.

21. The device of claim 1 further comprising:

a pulse width modulation (PWM) control circuit for receiving a series of PWM control words of different number of bits as a pulse width modulation PWM signal to control said reflecting element at said fully-ON and fully-Off angular positions for controlling a gray scale of display wherein said PWM control circuit further receiving said digital control signal as an oscillation signal for superimposing on said PWM signal for oscillating said reflecting element to said partially-ON angular position for further controlling said gray scale of display; and said PWM control words having a maximum number of bits of M to control a maximum number of $2^M$ PWM controlled gray scales and said oscillating signal for controlling said reflecting element to a partially-ON angular position further increasing a maximum number of controllable gray scale to $2^{(M+N)}$ where N is a positive integer.

22. The device of claim 19 wherein:

said PWM control words having a maximum number of seven bits and said N is three for providing a maximum controllable gray scale of $2^{10}$.

23. The device of claim 1 wherein:

said digital control signal is controlled for writing and rewriting into display pixels in an interleave-and-jump sequence to jump multiple lines to non-sequential lines of a display image wherein a time duration for writing and rewriting said display pixels in said multiple lines are determined to satisfy a minimum flickering-prevention display frequency.

* * * * *